United States Patent Office 3,520,900
Patented July 21, 1970

---

3,520,900
PROCESS FOR PREPARATION OF 1-(2′HYDROXY-ETHYL)-2-METHYL-5-NITROIMIDAZOLE
Tatjana Fajdiga, Franjo Kajfez, and Vitomir Sunjic, Novo Mesto, Yugoslavia, assignors to Krka Tovarno Zdravil, Novo Mesto, Yugoslavia
No Drawing. Filed May 24, 1967, Ser. No. 640,828
Claims priority, application Yugoslavia, June 20, 1966, 1,151/66
Int. Cl. C07d 49/36
U.S. Cl. 260—309          2 Claims

ABSTRACT OF THE DISCLOSURE 1-(2′-hydroxyethyl)-2 - methyl - 5 - nitroimidazole is prepared in high yields by hydrolysis of its halide esters in a medium consisting essentially of formamide, water, and formic acid, preferably in a ratio of 100:6:1.

---

The present invention relates a process for the preparation of 1-(2′-hydroxyethyl)-2-methyl-5-nitroimidazole of the Formula I

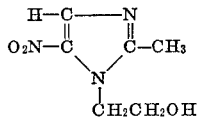

(I)

The process according to the invention is carried out by hydrolysis of a compound of the Formula II

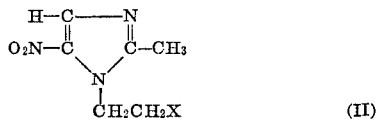

(II)

wherein X is halogen.

The hydrolysis is carried out with formamide in the presence of water and formic acid.

The most favourable ratio of formamide:water:formic acid is about 100:6:1.

Stirring of the hydrolysis mixture raises the yield of 1 - (2′ - hydroxyethyl) - 2 - methyl - 5 - nitroimidazole to 68–70%, whereas the yields of known methods are at most 20%.

1-(2′-hydroxyethyl)-2-methyl-5-nitroimidazole is used in medicine for the treatment of infections caused by *Andamoeba histolytica* and *Trichomonas vaginalis*. The process according to the invention is illustrated by the following example.

EXAMPLE

In a three-necked 100 ml. flask 11.7 g. of 1-(2′-bromoethyl)-2-methyl-5-nitroimidazole (M.P.=78–80° C.), 30 ml. of formamide, 1.8 ml. of water and 0.3 ml. of 98–100% formic acid are stirred intensively and heated to 110–115° C., and the mixture is kept at this temperature under constant intensive stirring for 3 hours. The formamide (27–28 ml.) is then distilled off at 0.7–0.8 mm. Hg (88–90° C.). On cooling the oily dark-brown residue begins to crystallize. It is dissolved in 20–25 ml. of water, mixed with 0.5 g. of active carbon and filtered. The filter is washed with 5–8 ml. of water so that the volume of the filtrate does not exceed 30 ml. Then the filtrate is adjusted with dilute sodium hydroxide solution to pH 9.5, and yellowish crystals start precipitating. After cooling, the crystals are filtered with suction and 6.9 g. (78% of theoretical) of a raw product are obtained, M.P.=156.0–160.5° C.

By recrystallization from 20 ml. of water or from 175 ml. of ethylacetate with 5–8% active carbon, 6.15 g. (69% of theoretical yield) of 1 - (2′ - hydroxyethyl)-2-methyl-5-nitroimidazole are obtained, M.P.=160–162° C.

What we claim is:
1. A process for the preparation of 1 - (2′-hydroxyethyl)-2-methyl-5-nitroimidazole which comprises holding a mixture of a compound of the formula

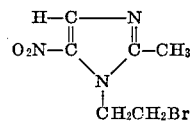

with a liquid medium essentially consisting of formamide, water, and formic acid at an elevated temperature until said compound is hydrolyzed to 1 - (2′ - hydroxyethyl)-2-methyl-5 - nitroimidazole, and recovering said 1-(2′-hydroxyethyl)-2-methyl-5-nitroimidazole from said mixture, the ratio of said formamide, water, and formic acid in said medium being substantially 100:6:1.

2. A process as set forth in claim 1, wherein said mixture is being stirred intensively while being kept at said temperature.

References Cited

UNITED STATES PATENTS

| | | | |
|---|---|---|---|
| 3,157,705 | 11/1964 | Pearce | 260—640 |
| 3,249,624 | 5/1966 | Karmas | 260—309 |

OTHER REFERENCES

Cosar et al. Chem. Abst., vol. 66, columns 2512–3 (1957, 1-2-67).
Patai Glossary of Organic Chemistry, p. 104, New York, Wiley, 1962.
Theilheimer I, Synthetic Methods of Organic Chemistry, vol. 6, p. 94 (1952).
Theilheimer II, Synthetic Methods of Organic Chemistry, vol. 9, p. 128 (1955).
Theilheimer III, Synthetic Methods of Organic Chemistry, vol. 15, p. 344 (1961).

HENRY R. JILES, Primary Examiner
N. TROUSOF, Assistant Examiner

U.S. Cl. X.R.
260—999